Jan. 5, 1926.
H. A. MYERS
CLUTCH DEVICE
Filed June 17, 1925
1,568,567
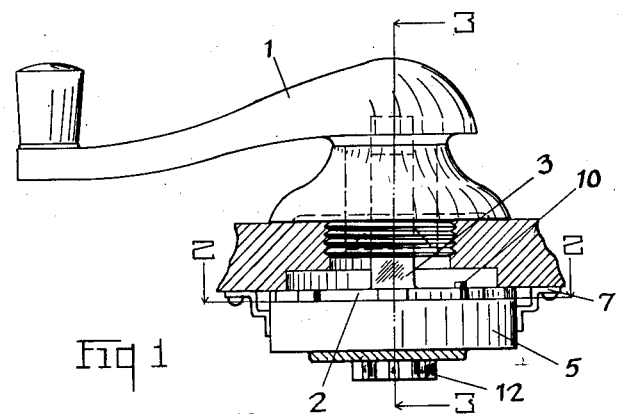
Fig 1
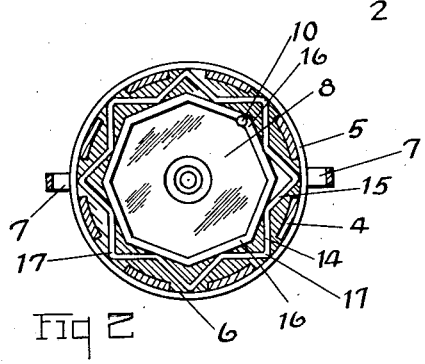
Fig 2
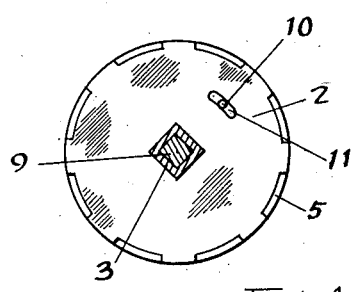
Fig 4
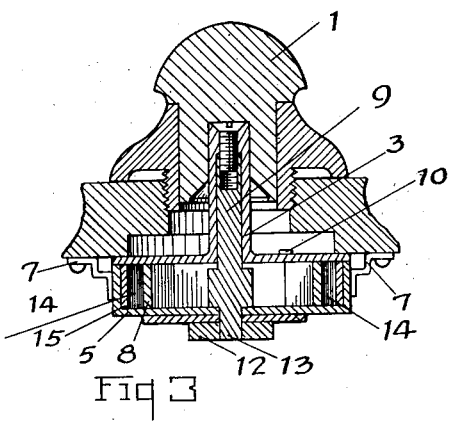
Fig 3
Fig 5
Inventor
Hubert A. Myers
By Owen, Owen & Crampton
Attorney Patented Jan. 5, 1926.

1,568,567

UNITED STATES PATENT OFFICE.

HUBERT A. MYERS, OF TOLEDO, OHIO.

CLUTCH DEVICE.

Application filed June 17, 1925. Serial No. 37,645.

*To all whom it may concern:*

Be it known that I, HUBERT A. MYERS, a citizen of the United States, and a resident of Toledo, in the county of Lucas and the State of Ohio, have invented a new and useful Clutch Device, which invention is fully set forth in the following specification.

My invention has for its object to provide a clutch device for connecting together members used for transmitting power from one to the other, and for preventing reverse transmission, or for preventing movement in either direction of the member to which transmission may be made, except when power is transmitted to it by movement of the first member. The invention may be used for a great variety of purposes but it is particularly adapted for use in connection with automobile window regulating devices whereby the window may be freely raised and lowered by rotative movement, such as, by a crank or handle, and movement of the window is prevented except by rotation of the rotative member. Thus the window is locked in position from upward movement from any cause and from downward movement such as might be due to the jogging effect on the window when the invention is embodied in an automobile window regulator. The means used in connection with my invention for raising and lowering the window may partake of different forms, and may be connected to the clutch device in any suitable manner to translate the rotative movements used in raising and lowering the window into the required rectilinear movements of the window. The invention may be contained in structures of different forms and in order to illustrate a practical application of the invention I have selected a structure containing the invention and illustrated it in the drawing forming a part hereof. The structure selected as an example is described hereinafter.

Figure 1 of the drawing illustrates a side view of the clutch device selected as an example. Fig. 2 is a view of a section taken on the plane of the line 2—2 indicated in Fig. 1. Fig. 3 is a view of a section taken on the plane of the line 3—3 indicated in Fig. 1. Fig. 4 is a top view of the clutch device. Fig. 5 is a side view of a rotative member for releasing the clutch.

The embodiment of the invention illustrated in the drawings is particularly adapted for use in connection with automobile window regulators for closing and opening the windows and adjusting the extent of the closure and for securing the window in its adjusted closed or open position. The windows are manually operated by the rotation of the crank 1, whch is connected to a rotatively supported member 2 that operates to release the clutch engagement and permit the crank 1 to raise and lower the window. Immediately on releasement of the crank 1, the clutch locks the window in the position to which it is moved either in raising or lowering the window, by the crank 1. The rotatable member is keyed to the hub of the crank in any desired manner as by the square protruding hub 3 that fits into a square hole formed in the hub. The rotative clutch releasing member 2 is provided with one or more fingers 4 that extend into a shell 5 having an inner cylindrical surface 6. Preferably the fingers 4 substantially fit within the cylindrical surface and when the rotatable member 2 is rotated relative to the shell 5 the fingers move along the surface 6. The shell 5 is secured by any suitable means to the supporting frame. In the construction shown the shell 5 is secured by projecting brackets 7 that may be fastened to the frame. Thus the shell 5 is held stationary relative to the crank 1 and the rotatable member 2. The rotative clutch releasing member 2 is connected to a cam for the purpose of rotating the cam, the connection being such that the rotatable member 2 may rotate very short distances in either direction before causing rotation of the cam. Thus the rotative member 2 may make limited rotative movement relative to the cam before the cam is moved by the rotative member 2. The came 8 is supported on the spindle 9 located within the square protruding hub 3 while the cam 8 is located between the rotative member 2 and the bottom of the shell 5. The cam 8 is provided with a pin 10 that protrudes into a slot 11 located in the rotative member 2 which permits limited movements of the rotative member relative to the cam 8. On further movement of the rotative member 2, one or the other of the ends of the slot 11 will engage the pin 10 and cause the cam 8 to rotate with the rotative member. When, therefore, the crank 1 is rotated, the rotative member 2 may move a short distance relative to the cam 8 and then the cam will be rotated by the crank 1. The object that is to be operated upon by rotation of the crank 1 is connected to the cam 8 by any suitable means. In the construction shown a pinion 12 is keyed to the hub 13 of the cam 8 which projects through the bottom of the shell 5. The pinion 12 is rotated when the cam is rotated and thus the pinion may operate on a rack or a gear wheel or any other suitable device which may be to connect the mechanism to a window to change the rotative movements of the crank and pinion to rectilinear movements of the window in order to raise and lower the window.

In order to secure the window in any of the positions to which it may be raised or lowered, a means is provided whereby the cam 8 may be engaged and held in position so that the pinion 12 cannot be rotated and consequently so that the window cannot be raised or lowered except through the operation of the crank 1. In the particular form of construction shown in the drawing a strip of metal 14 having one or more re-entrant parts 15 is located between the surface of the cam 8 and the cylindrical surface 6. The strip 14 is bent so as to alternately approach and recede from the said surfaces and so that when a force is applied to the cam, rotative movements of the cam will be prevented by reason of the engagement of the protruding portions 16 of the cam engaging the re-entrant parts of the strip 14, and forcing the outer-most parts 17 of the strip 14 against the cylindrical surface 6 of the shell 5. This will lock the cam 8 from rotation particularly if the re-entrant parts of the strip make contact with the protruding portions of the cam at their bases, and the outer-most parts of the strip make contact with the cylindrical surface 6 since the strip is held bound between the cam and the shell.

In order to release the clutch engagement the outer-most parts 17 of the strip 14 are located between the fingers 4 and consequently when the rotative member 2 is rotated relative to the cam 8 the fingers 4 will engage the outer-most part 17 of the strip and release it from the frictional engagement with the cylindrical surface 6 of the shell 5 and consequently the cam is released from its frictional engagement and as the rotative member continues in its rotation the pin 10 of the cam will be engaged by the end of the slot 11 and the pinion 12 will be rotated. Thus the pinion 12 may be rotated in either direction and immediately upon releasement of the crank 1 the strip 14 will re-engage the cylindrical surface 6 and lock the cam 8 in the position to which it has been moved when the crank 1 is released.

In order to provide a plurality of points of engagement and to produce a uniform action of the clutch mechanism, the strip 14 is preferably made substantially star shaped or it is corrugated, it being provided with parts that alternately make contact with the surface of the cam 8 and the cylindrical surface of the shell 5. Also the ends of the strips are preferably united to form a continuous band bent to shape and is formed of elastic material. The cam 8 is also provided preferably with plane surfaces to form a regular geometric figure such as a square or hexagon or an octagon and the strip 14 makes contact on opposite sides of the parts of the cam that are more remote from its axis so that when any force is applied to the cam other than through the crank 1 the cam 8 will be locked in position. Also the fingers 4 of the rotative member 2 are located between adjoining outer-most parts of the strip 14 and they are of such a width that within the limitations of the movements of the rotative member 2 relative to the cam 8, as determined by the length of the slot 11, the fingers 4 will engage and release the strip 14 from engagement with the cylindrical surface 6. Thus the crank 1 may be rotated in either direction to raise and lower the window to any point in the window frame as may be desired, where the clutch mechanism is used for the purpose of locking windows, and the window will be secured in the position to which it is moved by the operation of the crank 1.

I claim:

1. In a clutch device, a rotative cam, a member having a cylindrical surface, a rotative member connected to the cam for limited movements relative to the cam, a strip located between the cam and the cylindrical surface and having a re-entrant part engaged by the cam for forcing the outer-most part of the strip against the cylindrical surface.

2. In a clutch device, a rotative cam, a member having a cylindrical surface, a rotative member connected to the cam for limited movements relative to the cam, a strip located between the cam and the cylindrical surface and having a re-entrant part engaged by the cam for forcing the outer-most part of the strip against the cylindrical surface, the rotative member having means for engaging the outer-most part of the strip for releasing it from the cylindrical surface.

3. In a clutch device, a rotative cam having a plurality of protruding portions, a member having a cylindrical surface, a rotative member connected to the cam for limited movements relative to the cam, a strip located between the cam and the cylindrical surface and having a plurality of reentrant parts engaged by the cam for forcing the outer-most parts of the strip against the cylindrical surface.

4. In a clutch device, a rotative cam having a plurality of protruding portions, a member having a cylindrical surface, a rotative member connected to the cam for limited movements relative to the cam, a strip located between the cam and the cylindrical surface and having a plurality of reentrant parts engaged by the cam for forcing the outer-most parts of the strip against the cylindrical surface, the rotative member having parts for engaging the outer-most parts of the strip for releasing them from the cylindrical surface.

5. In a clutch device, a rotative cam having a plurality of protruding parts, a member having a cylindrical surface surrounding the cam, a strip surrounding the cam and located between the cam and the cylindrical surface, and having a plurality of reentrant parts engaged by the cam for forcing the outer-most parts of the strip against the cylindrical surface, the rotative member having a plurality of fingers for engaging the outer-most parts of the strip and releasing the strip from engagement with the cylindrical surface.

In testimony whereof I have hereunto signed my name to this specification.

HUBERT A. MYERS.